PATENTED APR 11 1972　3,655,487

INVENTOR.
ROBERT D. FARKAS
BY Ostrolenk, Faber, Gerb & Soffen
ATTORNEYS

United States Patent

Farkas

[15] 3,655,487
[45] Apr. 11, 1972

[54] HEAT SEALING APPARATUS

[72] Inventor: Robert D. Farkas, 5601 First Ave., Brooklyn, N.Y. 11215

[22] Filed: Mar. 9, 1970

[21] Appl. No.: 17,373

[52] U.S. Cl. .............................. 156/380, 156/583, 156/515
[51] Int. Cl. ................................ B29c 27/02, B32b 31/16
[58] Field of Search .............................. 156/380, 583, 515

[56] References Cited

UNITED STATES PATENTS

| | | |
|---|---|---|
| 2,961,031 | 11/1960 | Fener ..................................... 156/380 |
| 3,234,072 | 2/1966 | Dreeben ............................. 156/583 X |
| 3,262,833 | 7/1966 | Zelnick .................................. 156/583 |

*Primary Examiner*—Samuel Feinberg
*Assistant Examiner*—J. J. Devitt
*Attorney*—Ostrolenk, Faber, Gerb & Soffen

[57] ABSTRACT

Apparatus for heat sealing sheets of thermoplastic material is constructed with a Nichrome strip constituting the heated die element. The die strip is mounted to the movable press element, with one end fixedly secured thereto, and the other end of the strip being free to move longitudinally as the strip temperature increases. The motion of the strip is transmitted through a motion multiplying linkage to operate a movable contact out of engagement with a stationary contact when the strip has reached a predetermined temperature, which will occur after sufficient heat for sealing has been applied and prior to the application of excessive heat. The movable contact is automatically latched in the open position to maintain the flow of heating power to the strip interrupted at the end of the sealing operation. The latch releases the movable contact when the cooled strip is moved out of sealing position so that when the strip is next moved to sealing position the movable contact automatically engages the stationary contact to complete the heating circuit for the strip.

11 Claims, 4 Drawing Figures

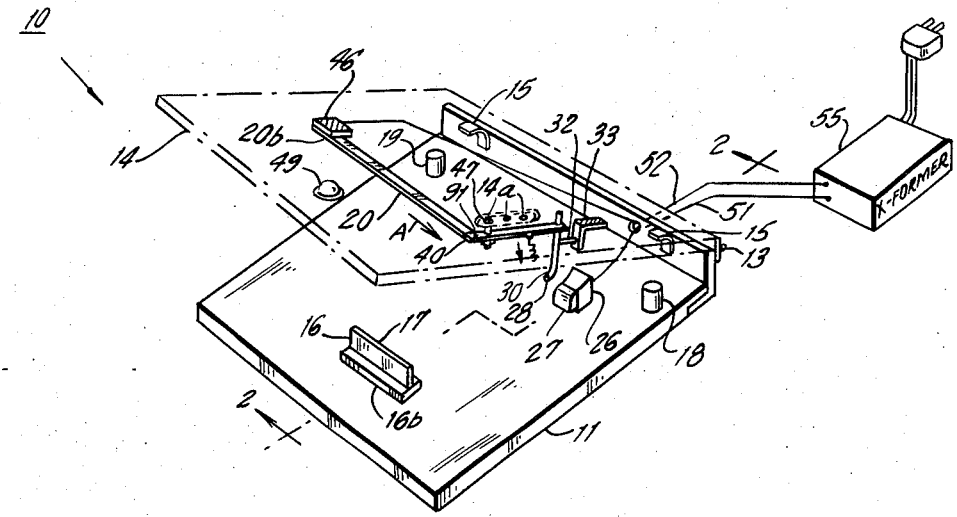

HEAT SEALING APPARATUS

This invention relates to heat sealing apparatus in general and more particularly relates to impulse type heat sealing apparatus of particularly simple construction and operation.

Heretofore, apparatus for heat sealing thermoplastic material has not been practical as a toy or household item. That is, apparatus utilizing high frequency current for heat sealing is relatively expensive even for light duty apparatus. Impulse sealing apparatus, though considerably less expensive than high frequency apparatus, has proven to have many drawbacks in the case of a stripped-down machine operated by inexperienced personnel. In particular, the quality of the heat seal is a function of temperature, pressure, and length of time during which the temperature and pressure are applied. In fact, it has been found necessary to automatically control the cut off of heating power to prevent imperfect sealing due to excessive heat.

In order to accomplish this is an inexpensive manner, the instant invention utilizes a strip of resistance heater material as the heated die. With the strip in sealing position one end thereof is rigidly fixed in position, while the other end is free to move longitudinally as the strip expands upon heating thereof. This expanding motion is transmitted through a motion multiplying linkage to automatically open the heater circuit for the die when the heated die reaches a predetermined temperature. The contact is latched open and is not permitted to reclose until the die is first lifted from the work and then brought down into sealing position.

Heating power is automatically applied to the die when the latter is brought into sealing position. Operation of the switch or contact means through the expansion of the die element automatically interrupts heating power after a sufficient amount, but not an excessive amount, of heat is applied to the plastic material for sealing thereof. A lamp connected in parallel with the die indicates when heating power is being applied to the die. The operator is instructed to maintain the die in sealing position for a short period of time after heating power is discontinued. During this period the die cools and the molten plastic material at the seal line solidifies to provide the seal.

The sealing die strip is extremely thin so that relatively low power is required for heating, and the die reaches sealing temperature in a relatively short time and cools rapidly.

Accordingly, a primary object of the instant invention is to provide novel inexpensive heat sealing apparatus.

Another object is to provide heat sealing apparatus of the impulse type having novel means for automatically controlling the application and discontinuance of heating power through the sealing die.

A further object is to provide impulse heat sealing apparatus in which the sealing die consists of a strip of resistance heater material, one end of which if fixed and the other end of which is free to move longitudinally as the strip is heated, so as to automatically open a switch to interrupt heating power to the strip, by utilizing a linkage providing mechanical amplification.

These objects as well as other objects of this invention will become readily apparent after reading the following description of the accompanying drawings in which.

Figure 1:
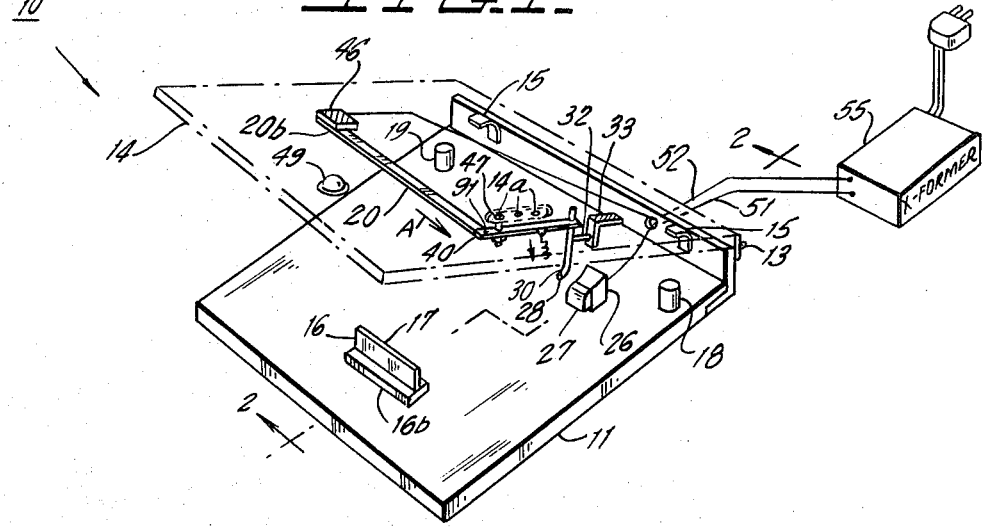
FIG. 1 is a perspective of heat sealing apparatus constructed in accordance with the teachings of the instant invention with the elements thereof in the open or work loading and unloading position.

Heat sealing apparatus 10 includes relatively stationary support or base 11 having L-shaped brackets 12 secured thereto and extending along the rear edge thereof. Hinge means 13 extending along the upper edge of bracket 12 pivotally mounts movable support 14 to base 11. A plurality of leaf spring 15 secured to the inner surface on the vertical leg of bracket 12, bias movable support 14 to the open position relative to base 14 (FIG. 1). In this open position of apparatus 10, die 20 is relatively distant from anvil 16 so as to permit insertion and removal of work consisting, typically, of two sheets 21, 22 of thermoplastic material (FIG. 2) that are to be bonded together by one or more heat seals.

Figure 2:
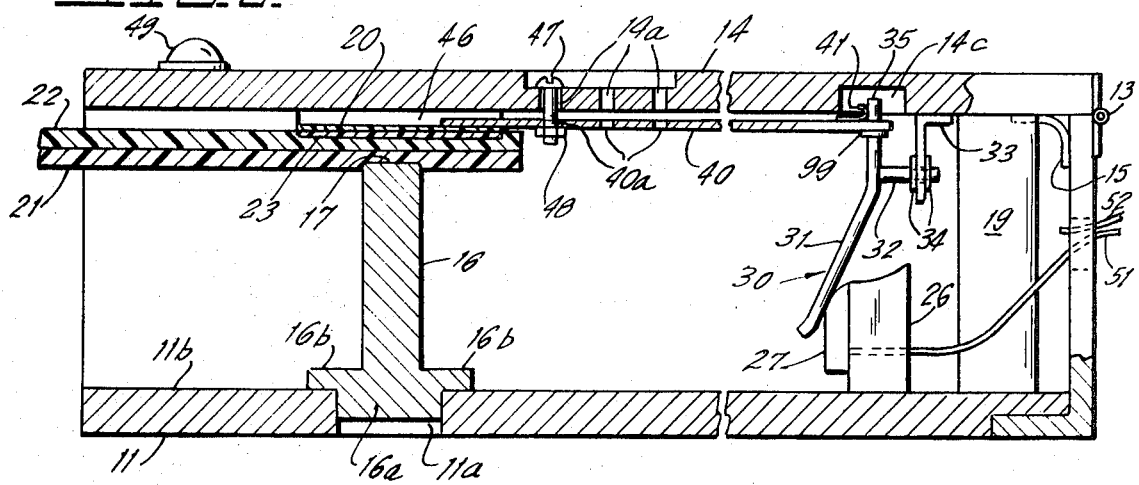
FIG. 2 is an enlarged cross section taken through line 2–2 of FIG. 1 looking in the direction of arrows 2–2 with the elements in the closed or sealing position.

Movable support 14 is pivotable counterclockwise with respect to FIG. 1 about hinge 15 toward base 11 to the sealing position shown in FIG. 2 wherein the Teflon impregnated glass cloth lower surface covering 23 of die strip 20 engages upper work sheet 22 and forces lower work sheet 21 into firm engagement with upper edge 17 of anvil 16. A pair of stops 18, 19, secured to base 11 and extending upward therefrom, limit movement of support 14 toward base 11 so that the force exerted by anvil 16 and die 20 on the work material 21, 22 will not cause excessive compression at the heat seal area where bonding takes place.

Anvil 16 is operatively positioned on upper surface 11b of base 11 by downward indexing formation 16a that is received by cooperating indexing formation 11a in base 11. Legs 16b, along the sides of anvil 16 near the bottom thereof, rest against upper surface 11b to stabilize anvil 16 when downward force is applied thereto.

Also mounted on the upper surface 11b of base 11 is insulating block 26 having stationary contact 27 mounted on the forward surface thereof. Contact 27 is part of switch means 30 that also includes movable contact 28 formed by the bent lower end of flexible rod-like switch actuator arm 31 having pivot pin 32 secured thereto at a point intermediate the ends thereof and extending transverse thereto. Pivot pin 32 extends into a clearance aperture in the downwardly extending leg of bracket 33 secured to the inner surface of movable support 14. A pair of spring retainers 34, received by spaced annular recesses (not shown) in pin 32, are positioned on opposite sides of the downwardly extending leg of bracket 33 to retain pin 32 mounted to bracket 33 and freely rotatable with respect thereto.

Upper end 35 of arm 31 extends through clearance aperture 36 at the rear end of bar 40 which rests against the upper surface of spring retainer 99 mounted on arm 31. Contact spring 41, secured to the upper surface of bar 40, engages the upper end 35 of arm 31 to maintain electrical contact between bar 40 and arm 31. As will hereinafter be seen, the location of pin 32 closer to bar 40 than to contact 27 provides motion multiplication of the movement for bar 40.

The forward end of bar 40 is pivotally secured by rivet 91 to free end 20a of the elongated resistance heater strip (typically Nichrome) comprising die 20. The other end 20b of die 20 is fixedly secured to insulating block 46 mounted to the inner surface of movable support 14. Pin 47 extends through the most forward aperture in the set of three clearance apertures 14a in movable support 14 and through the most forward aperture in the set of three clearance apertures 40a in bar 40, and cooperates with spring retainer 48 to pivotally mount bar 40 for movement parallel to the inner surface of movable support 14 in position adjacent to such inner surface. Head 47a of pin 47 is disposed within a recess in the upper surface of movable support 14.

Figure 3:
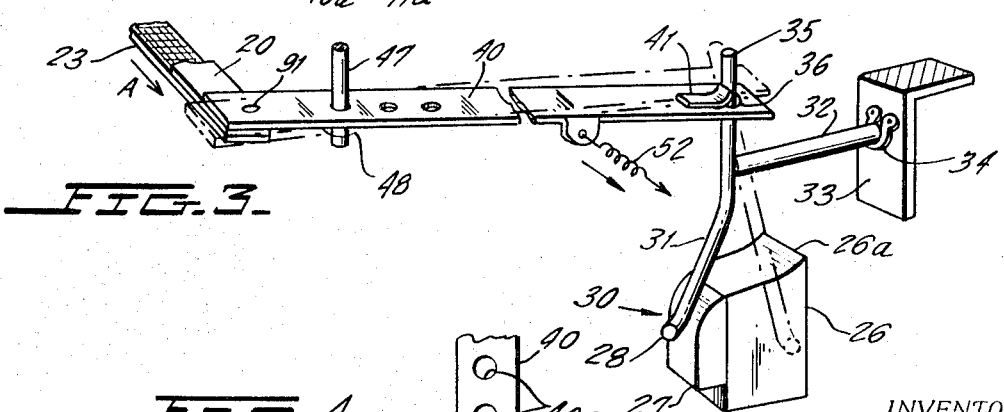
FIG. 3 is an enlarged perspective of the motion multiplying linkage in the apparatus of FIG. 1.

With the elements of heat sealing apparatus 10 in the position of FIG. 1, movable support 14 is raised and switch 30 is open in that movable contact 28 is separated from stationary contact 27. After the work consisting of thermoplastic sheets 21, 22 is placed on the upper edge 17 of anvil 16, support 14 is pivoted counterclockwise against the forces of opening spring 15 until the inner surface of support 14 engages the upper surfaces of stops 18, 19. During this downward movement contact 28 initially engages the cam formed upper surface 26a of insulator 26 which deflects arm 31 so that the lower end thereof, hence contact 28, moves forward past the upper edge of stationary contact 27 to the solid line position of FIG. 3 wherein switch 30 is closed. This completes a circuit extending from insulation covered conductor 51, through switch 30, arm 31, spring contact 41, bar 40, die 20 and insulation covered conductor 52. With switch closed, conductors 51, 52 connect the elongated strip resistance element constituting die 20 to the secondary of transformer 55 to supply electrical energy which generates heat in die 20.

Figure 4:
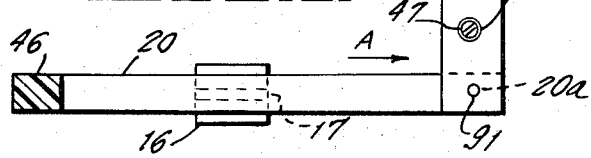
FIG. 4 is a fragmentary plan view showing the relation between the resistance heater die strip and the cooperating anvil when the apparatus is in sealing position.

As die 20 heats up, thermal expansion thereof is, for the most part, directed longitudinally. Since end 20b is in fixed position, end 20a moves to the right (direction of arrow A in FIGS. 1, 3 and 4) and acts through motion multiplying linkage 30, 40 to separate the contacts of switch 30. That is, as die end 20a moves in the direction of arrow A bar 40 is pivoted in a counterclockwise direction looking down at the top of pin 47. This moves upper end 35 of arm 31 to the left with respect to FIG. 1 causing contact 28 to wipe across the forward surface of stationary contact 27. When contact 28 reaches the near edge of contact 27 as viewed in FIG. 3, the self biasing of contact arm 31 forces contact 28 to the rear of contact 27 (phantom position of FIG. 3). As die 20 cools with die 20 in sealing position insulator 26 acts as a latch to block return movement of stationary contact 28 despite the force of contraction and the force exerted by tension spring 52 connected between arm 40 and support member 14.

By the time contact 28 separates from contact 27 in this manner, the temperature of die 20 has reached a sufficiently high level to cause a localized area of work sheets 21, 22 to become plastic and to fuse together provided sufficient heat is maintained for a sufficient period of time. The opening of switch means 30, hence deenergization of die 20, is indicated by the extinction of pilot light 49 mounted on the upper surface of support 14 and connected in electrical parallel with die 20.

Sealing time may be adjusted by changing the location of the pivot for bar 40. More particularly, the three-hole group of openings 40a is in alignment with the three-Hole group 14b in support 14. With pin 47 in the position closest to the end of bar 40 closest to die 20, motion of die end 20a is subjected to the greatest motion multiplication in the output at the other end of bar 40 where it connects to switch arm 31. Similarly with pin 47 in the hole 40a most distant from die end 20a, heating time is increased to the maximum in that multiplication of movement for die end 20a is the least of the three positions for pin 47.

Typically upper edge 17 of anvil 16 is one half inch long by one sixteenth inch wide, die 20 is one quarter inch wide by 3 inches long by 0.001 inch thick, and Teflon cover 23 is 0.005 inch thick. Energizing die 20 to draw 6 amps from a 3½ volt source, the application of heating power for 1 second is sufficient to heat seal two 0.010 inch thick layers of polyvinyl chloride.

It is noted that while anvil 16 is shown as providing a rectangular seal corresponding to edge 17, other anvil shapes, such as stars, diamonds, etc. may be used to provide seals in these shapes for decorating purposes. Changing an anvil is simply a matter of lifting its indexing extension from indexing recess 11a in base 11 and inserting the indexing extension of another anvil into recess 11a.

It is noted that switch 30 may be replaced by a commercially available push button operated switch biased to open position with the self bias of arm 31 being sufficient to overcome the switch biasing forces and maintain the switch when arm 31 is engaged with the free end of the push button. The lower end of arm 31 will slide across such free end, but will automatically drop off when a good heat seal is made and be latched against the side of the push button as the latter moves forward to open circuit position. Such commercially available switch may be connected to interrupt the transformer primary in which event die 20 will be permanently connected to the secondary.

While die 20 and other current carrying elements have been illustrated as being mounted to movable support 14, it should be apparent to those skilled in the art that many, if not all, of the current carrying elements may be mounted to bed 11 and anvil 16 may be secured to movable support 14.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive property or privilege is claimed are defined as follows:

1. Heat sealing apparatus including first and second support sections; means mounting said sections for relative movement between a closed, or sealing, position and an open, or work loading and unloading, position; heat sealing means including a die mounted to said first section and electrically energized first means for heating said die; switch means connected in circuit with said first means for controlling energization thereof; said switch means being operated automatically to closed circuit position upon movement of said sections from said open to said closed positions while said heat sealing means is relatively cool; second means connecting said heat sealing means to said switch means for automatically operating the latter to open circuit position to deenergize said first means when said heat sealing means becomes heated to a predetermined level while said sections are in said closed position; latch means for maintaining said switch means in said open circuit position after operation thereto by said heat sealing means; said switch means being operated automatically to said open circuit position upon movement of said section to said open position; said second means including a mechanical linkage movable by said heat sealing means upon expansion thereof to operate said switch means to said open circuit position.

2. Heat sealing apparatus as set forth in claim 1, in which said linkage is constructed to amplify motion of said heat sealing means upon expansion and contraction thereof.

3. Heat sealing apparatus as set forth in claim 2, in which said switch means includes a relatively movable and a relatively stationary cooperating contact; said movable contact being mounted for operation by one end of said linkage and said linkage having its other end secured to said heat sealing means.

4. Heat sealing apparatus as set forth in claim 3, in which said die means and said first means include a strip of metal constituting a resistance heater; one end of said strip being fixedly secured to said first section and the other end of said strip being free to move and drive said linkage as said strip expands during heating thereof.

5. Heat sealing apparatus as set forth in claim 4, in which, with said sections in closed position, heating of said strip causes said movable contact to wipe across said stationary contact until said strip heats to said predetermined level at which point said movable contact is driven beyond said stationary contact into engagement with said latch means.

6. Heat sealing apparatus as set forth in claim 5, in which there is a biasing means providing contact pressure as said movable contact wipes across said stationary contact, said biasing means also maintaining said movable contact in engagement with said latch means until subsequent operation of said sections to said open position.

7. Heat sealing apparatus as set forth in claim 3, in which the linkage comprises a bar mounted to a pivot located much closer to one end than to the other end thereof; said other end of said strip being secured to said one end of said bar.

8. Heat sealing apparatus as set forth in claim 7, in which the linkage also includes an arm secured at one end thereof to said other end of said bar and being mounted on a pivot that is substantially perpendicular to the pivot for said bar; said movable contact being at the other end of said arm.

9. Heat sealing apparatus as set forth in claim 8, in which with said sections closed, heating of said strip causes said movable contact to wipe across a face of said stationary contact until said strip heats to said predetermined level, at which point said movable contact is positioned clear of said face; said movable contact having self biasing means providing contact pressure while said movable contact is in engagement with said face; said self biasing means operating said movable contact into engagement with said latch means when said movable contact is moved clear of said face by expansion of said strip.

10. Heat sealing apparatus as set forth in claim 1 also including means for adjusting the heating level of said heat sealing means at which the latter operates said switch means to said open circuit position.

11. Heat sealing apparatus as set forth in claim 7 also including means for changing the location of said pivot with respect to the ends of said bar to adjust the heating level of said heat sealing means at which the latter operates said switch means to said open circuit position.

* * * * *